United States Patent
Kashiwabara et al.

(10) Patent No.: US 6,902,815 B2
(45) Date of Patent: Jun. 7, 2005

(54) COATING LIQUID FOR FORMING COLORED TRANSPARENT CONDUCTIVE FILM, SUBSTRATE WITH COLORED TRANSPARENT CONDUCTIVE FILM AND METHOD FOR ITS PRODUCTION, AND DISPLAY DEVICE

(75) Inventors: Satoshi Kashiwabara, Funabashi (JP); Satoshi Mototani, Funabashi (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/726,556

(22) Filed: Dec. 4, 2003

(65) Prior Publication Data
US 2004/0135127 A1 Jul. 15, 2004

Related U.S. Application Data

(63) Continuation of application No. PCT/JP02/05343, filed on May 31, 2002.

(30) Foreign Application Priority Data
Jun. 4, 2001 (JP) .......................................... 2001-168161

(51) Int. Cl.$^7$ ............................ B22F 9/18; H01J 31/00; B32B 15/16; B32B 15/01
(52) U.S. Cl. ....................... 428/434; 428/557; 428/559; 428/670; 252/514; 427/126.5; 427/191; 427/443.1; 313/479
(58) Field of Search ................................ 428/434, 670, 428/557, 559; 252/514; 427/126.5, 191, 443.1; 313/479

(56) References Cited

U.S. PATENT DOCUMENTS

| | | |
|---|---|---|
| 5,320,913 A | 6/1994 | Morimoto et al. |
| 5,501,883 A * | 3/1996 | Ishikawa et al. ............. 428/1.4 |
| 5,578,377 A | 11/1996 | Morimoto et al. |
| 6,451,433 B1 * | 9/2002 | Oka et al. .................... 428/432 |

FOREIGN PATENT DOCUMENTS

| | | |
|---|---|---|
| JP | 11-5929 | 1/1999 |
| JP | 11-25759 | 1/1999 |
| JP | 2000-113811 | 4/2000 |
| JP | 2000-276941 | 10/2000 |
| JP | 2001-64540 | 3/2001 |
| JP | 2002294301 | * 3/2001 |
| JP | 2002194248 | * 7/2002 |
| JP | 2003034530 | * 2/2003 |

OTHER PUBLICATIONS

Laid Open JP-A-2001-64540 w/ Full English Translation.

* cited by examiner

*Primary Examiner*—Deborah Jones
*Assistant Examiner*—Jason Savage
(74) *Attorney, Agent, or Firm*—Oblon, Spivak, McClelland, Maier & Neustadt, P.C.

(57) ABSTRACT

There is provided a coating liquid for forming a colored transparent conductive film using ruthenium in a fine particle form, which has a satisfactory electromagnetic wave shielding effect, which is excellent in transparency, chemical resistance, and abrasion resistance, and which achieves a neutral transmitted color tone. There are provided a substrate with the colored transparent conductive film and a method for its production, and a display device having the substrate as a front panel.

A coating liquid for forming a colored transparent conductive film is one characterized by containing noble metal-supporting ruthenium in a fine particle form wherein a noble metal except for ruthenium is supported in a fine particle form on ruthenium. A method for making the noble metal supported in the fine particle form is a method of adding a reducing agent into a dispersing liquid containing ruthenium particles and then adding thereinto a solvent containing a compound of a noble metal.

21 Claims, 2 Drawing Sheets

COATING LIQUID FOR FORMING COLORED TRANSPARENT CONDUCTIVE FILM, SUBSTRATE WITH COLORED TRANSPARENT CONDUCTIVE FILM AND METHOD FOR ITS PRODUCTION, AND DISPLAY DEVICE

TECHNICAL FIELD

The present invention relates to a colored transparent conductive film, and a substrate with the colored transparent conductive film and a method for its production. The present invention also relates to a coating liquid for forming the colored transparent conductive film and a display device having the substrate as a front panel.

BACKGROUND ART

In a display device such as a cathode ray tube, a vacuum fluorescent display, a plasma display panel, or the like, a colored transparent conductive film is formed on an outside surface of a transparent front panel (which means, for example, a panel in the case of the cathode ray tube), for the purpose of achieving high contrast, electromagnetic wave shielding, and so on, and a transparent film having a low refractive index is further formed on the colored transparent conductive film, thereby providing an antireflection function.

Conventional conductive films formed for an antistatic purpose need only have a surface resistance at a level of about $1 \times 10^5$ $\Omega/\square$, while the conductive films formed for the purpose of electromagnetic wave shielding are required to have a surface resistance as low as at most $1 \times 10^4$ $\Omega/\square$, and even at most $1 \times 10^2$ $\Omega/\square$.

In recent years, control on a color tone of a transmitted image by a surface treatment of a transparent substrate is becoming more advantageous in terms of cost and others than control on a color tone of a transmitted image by a transparent substrate itself. Therefore, there are increasing trends to provide a color tone control function by coloring a transparent conductive film.

Colored transparent conductive film having these functions are formed by applying a liquid containing dispersed fine particles of a noble metal such as gold, platinum, silver, palladium, or the like. However, gold, platinum, and palladium are expensive, and silver is low in chemical resistance to hydrochloric acid, a salt solution, and so on. For these reasons, proposals have been made to adopt a colored transparent conductive film using ruthenium.

Actually, use of ruthenium only raises a problem that the color tone of the transmitted image is not neutral, because its transmittance is low in a short wavelength region of visible light. Thus, it is necessary to compensate the color tone with a large amount of a complimentary-color material. However, the use of the complimentary-color material resulted in posing, in turn, problems of decrease in the electromagnetic wave shielding performance due to increase of the surface resistance, increase in the cost, degradation of abrasion resistance and chemical resistance, and so on.

It is an object of the present invention to provide a coating liquid for forming a colored transparent conductive film using fine particles of ruthenium, which can form a colored transparent conductive film having a satisfactory electromagnetic wave shielding effect, being excellent in transparency, chemical resistance, and abrasion resistance, and achieving neutral transmitted color tone. It is another object of the present invention to provide a substrate with the colored transparent conductive film and a method for its production, and a display device having the substrate as a front panel.

DISCLOSURE OF THE INVENTION

The present invention provides a coating liquid for forming a colored transparent conductive film (hereinafter, referred to as "the present coating liquid"), which comprises noble metal-supporting ruthenium in a fine particle form (hereinafter, referred to as "noble metal-Ru") wherein a noble metal except for ruthenium is supported in a fine particle form on ruthenium.

The present invention also provides a method for producing a coating liquid for forming a colored transparent conductive film, wherein a reducing agent is added into a dispersing medium containing ruthenium in a fine particle form, and thereafter a compound of a noble metal except for ruthenium is added thereinto, to form a coating liquid for forming a colored transparent conductive film; a method for producing a substrate with a colored transparent conductive film, wherein the present coating liquid is applied onto a substrate, to form a colored transparent conductive film; and a method for producing a substrate with a colored transparent conductive film, wherein the present coating liquid is applied onto a substrate, and thereafter a coating liquid containing a silicon alkoxide is applied thereonto, to form a colored transparent conductive film.

Further, the present invention provides a substrate with a colored transparent conductive film produced by the above-stated method; a substrate with a colored transparent conductive film produced by the above-stated method, wherein $T_{MIN}/T_{MAX}$, which is a ratio of the minimum value $T_{MIN}$ to the maximum value $T_{MAX}$ of transmittance in a wavelength range of 400–700 nm, is at least 0.85, and the substrate having an excellent abrasion resistance; and a cathode ray tube wherein the above-stated substrate with the colored transparent conductive film is used as a panel, and wherein the colored transparent conductive film is formed on an outside surface of the panel.

BEST MODE FOR CARRYING OUT THE INVENTION

Figure 1:
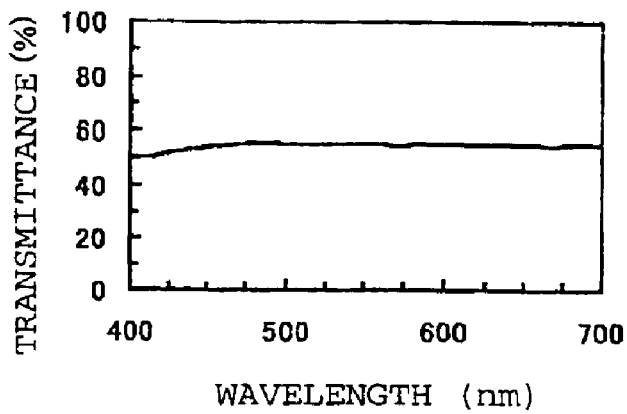
FIG. 1 shows a transmission spectrum of a low-reflecting colored transparent conductive film of Example 1.
Figure 2:
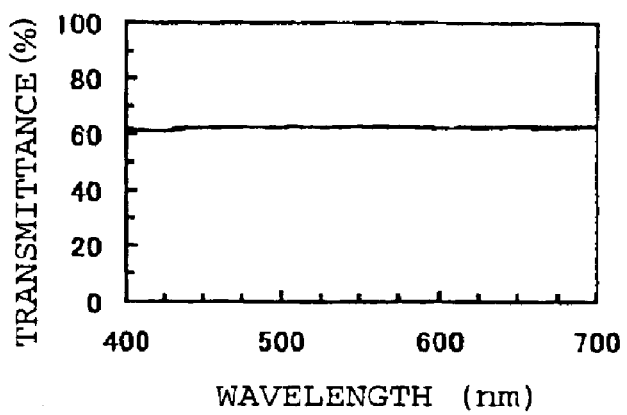
FIG. 2 shows a transmission spectrum of a low-reflecting colored transparent conductive film of Example 2.
Figure 3:
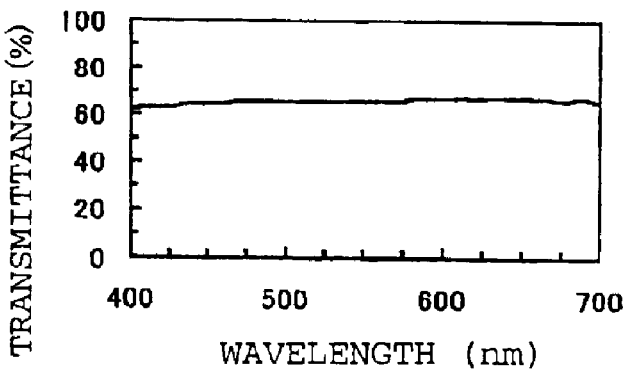
FIG. 3 shows a transmission spectrum of a low-reflecting colored transparent conductive film of Example 3.
Figure 4:
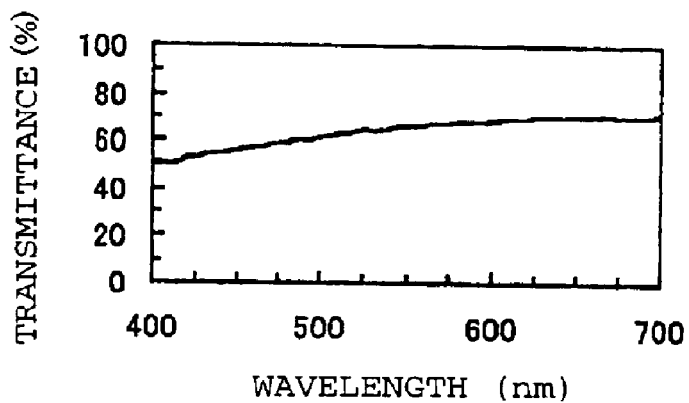
FIG. 4 shows a transmission spectrum of a low-reflecting colored transparent conductive film of Example 4.
Figure 5:
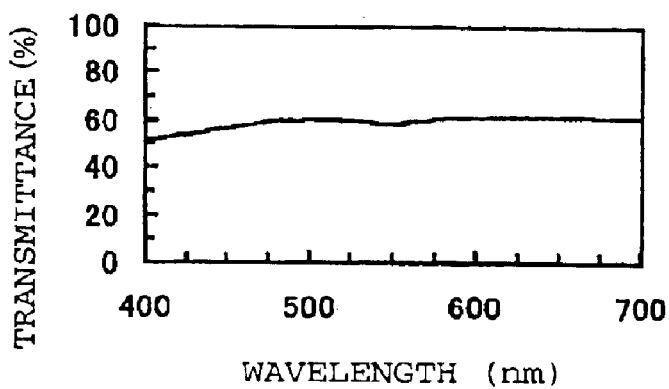
FIG. 5 shows a transmission spectrum of a low-reflecting colored transparent conductive film of Example 5.
Figure 6:
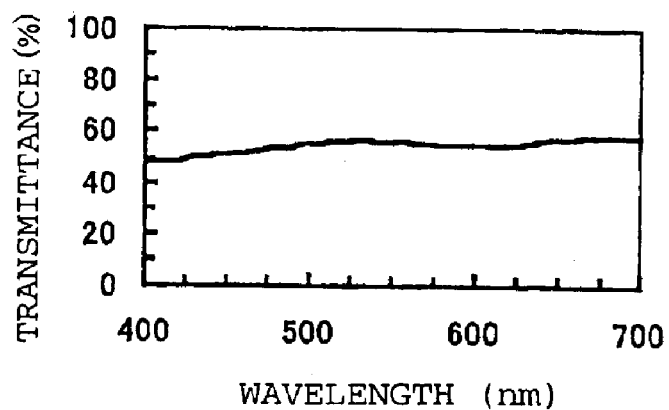
FIG. 6 shows a transmission spectrum of a low-reflecting colored transparent conductive film of Example 6.

Ruthenium particles in the present coating liquid are made by dissolving a ruthenium compound (preferably a ruthenium salt) in a solvent (preferably water or an organic solvent), adjusting pH of the liquid with ammonia or the like, if required, and thereafter adding a reducing agent thereinto. Then they are solated by an operation such as stirring. In this step, in order to improve the dispersibility of ruthenium particles, surfaces of the ruthenium particles may partially be oxidized by irradiation of infrared, irradiation of ultraviolet, addition of an oxide, a heat treatment, or the like.

Examples of the ruthenium salt as described above include nitrates such as ruthenium nitrosonitrate; chlorides such as ruthenium chloride, ruthenium ammonium chloride, ruthenium potassium chloride, and ruthenium sodium chloride; and acetates such as ruthenium acetate.

Examples of the reducing agent as described above include hydrides such as sodium borohydride, potassium borohydride, sodium hydride, and lithium hydride; organic acids such as formic acid and phosphinic acid; and salts of inorganic acids such as sodium phosphinate and Rochelle salt.

Ruthenium in the ruthenium particles may further contain a ruthenium oxide and/or a ruthenium hydroxide. Further, the ruthenium may contain other metal in a non-supported manner. The other metal can be one or more metals selected from the group consisting of gold, silver, platinum, palladium, rhodium, copper, cobalt, tin, indium, and tantalum, and/or an oxide or oxides thereof. An amount of the other metal added is preferably 0.1–100% by mass as metal (also as metal in the case of a metal oxide) to ruthenium.

Further, the ruthenium in the ruthenium particles may be alloyed with the above-described other metal to form a ruthenium alloy. In this case, a metal likely to form a solid solution with ruthenium at room temperature is particularly preferred as the other metal in terms of chemical resistance; an example thereof is at least one selected from the group consisting of cobalt, iron, and palladium. Further, the ruthenium alloy may be an oxide thereof.

A method of making a noble metal except for ruthenium (hereinafter referred to simply as "the noble metal") supported in a fine particle form on the ruthenium particles, is, for example, a method of adding a reducing agent into a dispersing medium containing the ruthenium particles, and thereafter adding a compound of the noble metal (preferably, a salt of the noble metal) thereinto. Another supporting method can be a method of adding a compound of the noble metal (preferably, a salt of the noble metal) into the dispersing medium containing the ruthenium particles, and thereafter adding a reducing agent thereinto.

The equilibrium potential of the noble metal used in the present invention is preferably 0.42–2.0 V larger than that of ruthenium. If the equilibrium potential of the noble metal is smaller than that of ruthenium, a local cell is formed between the supported noble metal particles and the ruthenium particles, and the supported noble metal particles tend to be again dissolved, so as to become unlikely to be supported. The noble metal likely to be supported is, for example, at least one metal selected from the group consisting of gold, platinum, palladium, rhodium, and osmium.

When the noble metal particles are supported on the ruthenium particles, the noble metal compound is preferably added in such an amount that the noble metal becomes 0.1–300 mol % to ruthenium, in order to further neutralize the transmitted color tone (i.e., in order to achieve low wavelength-dependency of transmittance) of the colored transparent conductive film obtained. In view of lowering a contact resistance at junctions between the particles and thereby reducing the surface resistance of the colored transparent conductive film obtained, the content of the noble metal is particularly preferably 5–60 mol % to ruthenium.

The noble metal-Ru is preferably monodisperse particles, and an average particle size thereof is preferably in a range of 10–100 nm. If the average particle size exceeds 100 nm, the particles tend to become unlikely to be dispersed, and also increase absorption of light, so as to decrease an optical transmittance of the colored transparent conductive film and increase haze, which is undesirable. On the other hand, if the average particle size is less than 10 nm, the surface resistance of noble metal-Ru tends to suddenly increase, so as to suddenly increase the surface resistance of the colored transparent conductive film obtained, which is undesirable. The average particle size is particularly preferably in a range of 30–60 nm.

The noble metal-Ru needs to be uniformly dispersed in the dispersing medium, and agitation is preferably conducted, for example, with a grinder mill such as a colloid mill, a ball mill, a sand mill, a homomixer, or the like. Further, on the occasion of dispersing the particles, a heat treatment is preferably conducted in a range of 20–200° C. to increase efficiency of dispersion. If the agitation is carried out at a temperature higher than the boiling point of the dispersing medium, it should be conducted under pressure to maintain the liquid phase. Obtained in this manner is an aqueous sol or an organosol in which the noble metal-Ru is dispersed in a colloidal particle form.

The aqueous sol or organosol can be used as a coating liquid as it is. Further, in order to improve wettability to the substrate, the coating liquid can also be formed by concentrating the aqueous sol or organosol to obtain the noble metal-Ru, and then dispersing it in an organic solvent. In addition, the coating liquid can also be formed by replacing water in the aqueous sol with an organic solvent. The organic solvent used herein can be at least one solvent selected from the group consisting of alcohols (methanol, ethanol, 1-propanol, 2-propanol, various butyl alcohols such as 1-butanol, etc.), ethers (ethyl cellosolve, methyl cellosolve, butyl cellosolve, propylene glycol monomethyl ether, etc.), ketones (2,4-pentanedione, diacetone alcohol, etc.), and esters (ethyl lactate, methyl lactate, etc.).

To control viscosity, surface tension, and spreadability of the liquid, a matrix component acting as a binder may be added to the present coating liquid. Specifically, the component added can be a metal alkoxide represented by the formula $M(OR)_x \cdot R'_{4-x}$ (M is silicon, titanium, or zirconium; each of R and R' is independently an alkyl group; and x is 1, 2, 3, or 4) and/or a partially hydrolyzed compound thereof.

A surfactant may be added to the present coating liquid in order to improve the wettability to the substrate. Examples of the surfactant include sodium alkyl benzene sulfonate, alkylether sulfate, and so on.

From the viewpoint of the fluidity of the present coating liquid and the dispersibility of the noble metal-Ru in the present coating liquid, a concentration of the noble metal-Ru in the present coating liquid is preferably in a range of 0.1–3% by mass in the present coating liquid and particularly preferably in a range of 0.3–0.8% by mass.

A method for applying the present coating liquid onto the substrate is, for example, a spin coat method, a dip coat method, or a spray coat method. Further, the surface may be made uneven by the spray coat method to impart an anti-glare property thereto. Furthermore, a hard coat or non-glare coat such as a silica coat may be formed on the colored transparent conductive film.

For preventing the solvent in the present coating liquid from remaining in the colored transparent conductive film, the colored transparent conductive film is preferably subjected to a heat treatment. The heating temperature can be normally optionally selected from in a temperature range lower than a softening point of a substrate, and in the case of the panel for a cathode ray tube, for example, the heating temperature is preferably in a range of 100–500° C.

A thickness of the colored transparent conductive film obtained, which can be optionally adjusted by the temperature of the substrate during coating, the concentration of the coating liquid, or the like, is preferably in a range of 20–100 nm. If the thickness is less than 20 nm, the particles tend to become unlikely to be uniformly dispersed on the substrate, so that it becomes difficult to obtain the desired conductive property. On the other hand, if the thickness exceeds 100 nm, the film tends to demonstrate so strong absorption of light as to lower a visible light transmittance, which is undesirable. The thickness is particularly preferably in a range of 20–60 nm.

To keep neutral the transmitted color tone of the substrate with the colored transparent conductive film, $T_{MIN}/T_{MAX}$, which is a ratio of the minimum value $T_{MIN}$ to the maximum value $T_{MAX}$ of transmittance of the film-coated substrate in a wavelength range of 400–700 nm, is preferably at least 0.85. Color other than black can be visually observed in a range of less than 0.85, and make it difficult to achieve the desired transmitted color tone. $T_{MIN}/T_{MAX}$ is particularly preferably at least 0.90.

In order to neutralize the transmitted color tone of the colored transparent conductive film formed by applying the present coating liquid, the particles of the noble metal except for ruthenium need to be supported on the ruthenium particles in the present coating liquid. The term "supported" means that a metal is deposited or adsorbed on a support medium. If a film is formed by applying a coating liquid containing ruthenium particles without the noble metal particles thereon, the transmitted color tone thereof will not be neutral and the abrasion resistance will be low. The conceivable reason why the transmitted color tone becomes neutral is that the properties of the noble metal particles become hard to appear when the noble metal particles are supported.

Further, a low refractive index film having a lower refractive index than that of the colored transparent conductive film, can be formed on the colored transparent conductive film to obtain a low-reflecting colored transparent conductive film.

For example, in a case where the substrate is glass (refractive index n=1.52), the visible light reflectance can be most reduced when the low refractive index film is formed on the colored transparent conductive film so that a ratio of (refractive index of the conductive film)/(refractive index of the low refractive index film) becomes about 1.23.

The low refractive index film can be obtained by using as a coating liquid a solvent containing $MgF_2$ sol and/or a solvent containing a silicon alkoxide. For example, in the case of the glass substrate, the low refractive index film formed by using the solvent containing $MgF_2$ sol is superior in decrease of reflectance, while the low refractive index film formed by using the solvent containing a silicon alkoxide is superior in hardness and abrasion resistance of the film.

The solvent containing a silicon alkoxide can be a solvent containing a silicon alkoxide represented by $Si(OQ)_y \cdot Q'_{4-y}$ (each of Q and Q' is independently an alkyl group, and y is 3 or 4) and/or a partially hydrolyzed compound thereof. Examples of the silicon alkoxide preferably used include silicon tetraethoxide, silicon tetramethoxide, silicon tetraisopropoxide, silicon tetraisobutoxide, and so on.

The silicon alkoxide can be used as dissolved in a solvent such as an alcohol, an ester, an ether, or the like, or as hydrolyzed by adding hydrochloric acid, nitric acid, sulfuric acid, acetic acid, formic acid, maleic acid, hydrofluoric acid, an ammonia aqueous solution, or the like to the solution. The concentration of the silicon alkoxide is preferably in a range of 0.1–30% by mass as $SiO_2$ to the solvent from the viewpoint of storage stability of the coating liquid.

Furthermore, a binder can be added into the coating liquid to improve the strength of the low refractive index film. Materials preferably used as the binder are, for example, alkoxides of at least one metal selected from the group consisting of zirconium, titanium, tin, and aluminum, and partially hydrolyzed compounds thereof.

The thickness of the low refractive index film formed on the colored transparent conductive film can be optionally controlled. The film thickness is preferably in a range of 30–100 nm. If the film thickness is outside the above range, it will be hard to fully achieve the low reflection property based on double interference effect. The thickness is more preferably in a range of 30–80 nm.

In the present invention, the low reflective index film can be formed above the colored transparent conductive film, or both above and below it to obtain a multi-layer conductive film. When $\lambda$ represents a wavelength of light reflection of which is to be prevented (for example, light in a wavelength range of 500–550 nm being a visible light), typical examples of the multi-layer film include the following films: a two-layered low reflecting film wherein a high refractive index layer—a low refractive index layer are formed in optical thicknesses of $\lambda/2 - \lambda/4$ or $\lambda/4 - \lambda/4$ from the substrate side; a three-layered low reflecting film wherein a middle refractive index layer—a high refractive index layer—a low refractive index layer are formed in optical thicknesses of $\lambda/4 - \lambda/2 - \lambda/4$ from the substrate side; and a four-layered low reflecting film wherein a low refractive index layer—a middle refractive index layer—a high refractive index layer—a low refractive index layer are formed in optical thicknesses of $\lambda/2 - \lambda/2 - \lambda/2 - \lambda/4$ from the substrate side.

The colored transparent conductive film of the present invention can be employed as the middle refractive index layer or the high refractive index layer.

The substrate of the present invention is preferably a transparent substrate, e.g., a material made of glass, plastic, or the like. Further, the substrate can have a shape such as a flat plate, a curved plate, a three-dimensional object, a film, or the like. Examples of the display device according to the present invention include a cathode ray tube, a vacuum fluorescent display, a plasma display panel, and so on. The colored transparent conductive film is formed on an outside surface of a front panel of these display devices (i.e., a portion displaying an image; for example, where the display device is a cathode ray tube, the front panel refers to its panel). The colored transparent conductive film may be formed both on the outside surface and on the inside surface.

EXAMPLES

Now, the present invention will be described in further detail, with reference to Examples. However, it should be understood that the present invention is by no means restricted to such specific Examples. Examples 1–3 are Examples of the present invention and Examples 4–6 are Comparative Examples. Methods for evaluation of the films obtained (or the film-coated substrates) are as follows:

1) Surface resistance: The surface resistance (unit: $\Omega/\square$) was measured for the film formed on the outside surface of the panel for cathode ray tube, with the Lorester resistance measuring machine (manufactured by MITSUBISHI CHEMICAL CORPORATION).

2) $T_{MIN}/T_{MAX}$: The transmittance of a film-coated glass piece cut out of the cathode ray tube panel with the film was measured in the wavelength region of 400–700 nm with a spectrophotometer (UV-2100 manufactured by Shimadzu Corporation); the transmittance of the glass piece of the cathode ray tube panel only was measured as blank value, and subtracted from the transmittance of the film-coated glass piece; $T_{MIN}/T_{MAX}$ was calculated from the maximum value $T_{MAX}$ and the minimum value $T_{MIN}$ of transmittance in the wavelength region.

3) Abrasion resistance: The surface of the film formed on the cathode ray tube panel was rubbed back and forth 50 times under the load of 9.8 N with an eraser (50–50 manufactured by LION OFFICE PRODUCTS CORP). The degree of abrasion on the surface was evaluated by eye observation. The evaluation criteria were o: no abrasion, Δ: a little abrasion, and x: film peeling in part. The evaluation rating "o" is preferable in practical use.

4) Pencil hardness: The "pencil scratch" (JIS K5400) was measured for the film formed on the cathode ray tube panel. The hardness is preferably at least 8H in practical use.

5) Visible light reflectance: The visible light reflectance was measured for the film formed on the cathode ray tube panel with a GAMMA spectral reflectometer. To suppress the reflection from the back surface of the panel, the back surface of the cathode ray tube panel was painted black, prior to the measurement. The reflectance is preferably at most 0.5% in practical use.

6) Transmittance of film: The transmittance was measured for a film-coated glass piece cut out of the cathode ray tube panel with the film, with the spectrophotometer (UV-2100 manufactured by Shimadzu Corporation). Further, the transmittance of the glass piece of the cathode ray tube panel only was measured as blank value, and subtracted from the transmittance of the film-coated glass piece to obtain the transmittance of the film at 555 nm. The transmittance of the film is preferably in the range of 55–65% in practical use.

7) Chemical resistance: The absolute value Δ (%) of the difference between transmittances of film at 555 nm before and after 5-days immersion in a 0.5 mol/liter hydrochloric acid aqueous solution, was measured. The larger the value, the lower the chemical resistance, and the value is preferably at most 2.0% in practical use.

8) Transmission spectrum: The transmittance was measured for a film-coated glass piece cut out of the cathode ray tube panel with the film in the wavelength region of 400–700 nm with the spectrophotometer (UV-2100 manufactured by Shimadzu Corporation); and the transmittance of the glass piece of the cathode ray tube panel was also measured as blank value, and subtracted from the transmittance of the film-coated glass piece.

The average particle size was determined as follows: particle sizes were measured with a particle size distribution measuring apparatus (Microtrac UPA manufactured by NIK-KISO CO., Ltd.) under the condition that fine particles did not flocculate with each other in the coating liquid, and the median of particle sizes was calculated from the particle size distribution.

Incidentally, the cathode ray tube panel in the examples and comparative examples is a panel formed by vacuum adhering a flat panel (the color tone of which is clear) of 17 inches (i.e., the diagonal length of about 442 mm; the aspect ratio 4:3; the curvature of the outside surface: 40000 mm) and a funnel to each other at increasing temperature with frit, and then cooling the complex down to room temperature.

A diluent, a ruthenium hydrosol, a silica liquid, and a gold hydrosol were prepared as follows:

[Diluent]

The diluent used was a mixed solution of water/ethanol/methanol/propylene glycol monomethyl ether=50/42/5/3 (ratio by mass).

[0.5% By Mass Ruthenium Hydrosol]

Sodium borohydride was added in the molar quantity of four times that of ruthenium into an aqueous solution of ruthenium trichloride (ruthenium content: 0.1% by mass) to reduce and precipitate ruthenium. The solution was stirred to obtain a hydrosol containing ruthenium fine particles having an average particle size of 20 nm. Then, the hydrosol was concentrated to obtain a ruthenium hydrosol containing ruthenium particles in a concentration of 0.5% by mass. No unreacted sodium borohydride was detected in the hydrosol.

[0.8% By Mass Silica Liquid]

An adequate amount of diluted hydrochloric acid was added into an ethanol solution of silicon tetraethoxide to hydrolyze the entire amount of the ethoxide. Then, an appropriate amount of ethanol was added thereto to prepare an ethanol solution having a silica content of 5% by mass. Further, the solution was diluted with the diluent prepared above, to obtain a silica liquid having a silica content of 0.8% by mass.

[0.5% By Mass Gold Hydrosol]

Formaldehyde was added in the molar quantity of two times that of gold into a chloroauric acid (gold content: 0.1% by mass) to reduce and precipitate gold. The solution was stirred to obtain a hydrosol containing gold particles having an average particle size of 18 nm. Then, the hydrosol was concentrated to obtain a gold hydrosol having a gold particle concentration of 0.5% by mass. No unreacted formaldehyde was detected in the hydrosol.

Example 1

There were prepared an aqueous solution of chloroauric acid containing gold in a concentration corresponding to 11 mol % to ruthenium in the ruthenium hydrosol as an object of addition, and 0.5% by mass ruthenium hydrosol to which sodium borohydride was further added as a reducing agent in a concentration corresponding to 11 mol % (i.e., equimolar amount to gold) to ruthenium.

The reducing agent-added ruthenium hydrosol was added into the chloroauric acid aqueous solution to obtain a gold-supported ruthenium hydrosol. Particles in the sol had an average particle size of 30 nm. The hydrosol was concentrated into a metal concentration of 3.0% by mass, and thereafter the sol was diluted with the aforementioned diluent to obtain a coating liquid for forming a colored transparent conductive film having a metal concentration of 0.5% by mass.

This coating liquid was applied onto the outside surface of the cathode ray tube panel by the spin coat method under the conditions of 150 rotations/min and 100 seconds, followed by drying at room temperature. Then, the 0.8% by mass silica liquid was applied onto the colored transparent conductive film by the spin coat method under the conditions of 150 rotations/min and 100 seconds, dried at room temperature, and heated at 180° C. for 30 min, thereby obtaining a low-reflecting colored transparent conductive film in which the $SiO_2$ low refractive index film was laid on the colored transparent conductive film. Evaluation results and a transmission spectrum of the low-reflecting colored transparent conductive film thus obtained are shown in Table 1 and FIG. 1, respectively. (Evaluation results and transmitted spectra in Examples 2–6 below are also shown in Table 1 and FIGS. 2–6, respectively.)

Example 2

There were prepared an aqueous solution of chloroplatinic acid containing platinum in a concentration corresponding to 12 mol % to ruthenium in the ruthenium hydrosol as an object of addition, and 0.5% by mass ruthenium hydrosol to which formaldehyde was further added as a reducing agent in a concentration corresponding to 24 mol % (i.e., twice that of platinum) to ruthenium.

The reducing agent-added ruthenium hydrosol was added into the chloroplatinic acid aqueous solution to obtain a platinum-supported ruthenium hydrosol. Particles in the sol had an average particle size of 52 nm. The hydrosol was concentrated into a metal concentration of 2.0% by mass, and thereafter the sol was diluted with the aforementioned diluent to obtain a coating liquid for forming a colored transparent conductive film having a metal concentration of 0.5% by mass. The coating liquid and the 0.8% by mass silica liquid were applied onto the outside surface of the cathode ray tube panel in much the same manner as in Example 1 to form a low-reflecting colored transparent conductive film.

Example 3

There were prepared an aqueous solution of palladium acetate containing palladium in a concentration corresponding to 19 mol % to ruthenium in the ruthenium hydrosol as an object of addition, and 0.5% by mass ruthenium hydrosol to which formaldehyde was further added as a reducing agent in a concentration corresponding to 47.5 mol % (i.e., two and half times that of palladium) to ruthenium.

The reducing agent-added ruthenium hydrosol was added into the palladium acetate aqueous solution to obtain a palladium-supported ruthenium hydrosol. Particles in the sol had an average particle size of 34 nm. The hydrosol was concentrated into a metal concentration of 4.5% by mass, and thereafter the sol was diluted with the aforementioned diluent to obtain a coating liquid for forming a colored transparent conductive film having a metal concentration of 0.5% by mass. The coating liquid and the 0.8% by mass silica liquid were applied onto the outside surface of the cathode ray tube panel in much the same manner as in Example 1 to form a low-reflecting colored transparent conductive film.

Example 4

The 0.5% by mass ruthenium hydrosol (water medium) was concentrated into a metal concentration of 2.2% by mass without adding any reducing agent, and thereafter the sol was diluted with the aforementioned diluent to obtain a coating liquid for forming a colored transparent conductive film having a metal concentration of 0.5% by mass. This coating liquid and the 0.8% by mass silica liquid were applied onto the outside surface of the cathode ray tube panel in much the same manner as in Example 1 to form a low-reflecting colored transparent conductive film.

Example 5

A 0.5% by mass ruthenium hydrosol, and a 0.5% by mass gold hydrosol having a gold content corresponding to 18 mol % to ruthenium in the ruthenium hydrosol were mixed to obtain a ruthenium-gold mixed hydrosol. Particles in the sol had an average particle size of 18 nm. No aggregation was observed due to the mixture of particles based on the mixing. The ruthenium-gold mixed hydrosol was concentrated into a metal concentration of 2.0% by mass, and then diluted with the diluent to obtain a coating liquid for forming a colored transparent conductive film having a metal concentration of 0.4% by mass. The coating liquid and the 0.8% by mass silica liquid were applied onto the outside surface of the cathode ray tube panel in much the same manner as in Example 1 to obtain a low-reflecting colored transparent conductive film.

Example 6

Phthalocyanine Blue being a blue pigment was crushed by a sand mill for one hour and then deflocculated to prepare a 1.0% by mass Phthalocyanine Blue dispersing liquid with water as a solvent. The Phthalocyanine Blue dispersing liquid and the ruthenium hydrosol were mixed at a ratio of 1.0% by mass. Phthalocyanine Blue dispersing liquid/0.5% by mass ruthenium hydrosol=3/7 (mass ratio). Particles in the liquid had the average particle size of 300 nm. The mixture was diluted with the aforementioned diluent to the concentration of ruthenium particles alone of 0.3% by mass, to obtain a coating liquid for forming a colored transparent conductive film. The coating liquid and the 0.8% by mass silica liquid were applied onto the outside surface of the cathode ray tube panel in much the same manner as in Example 1 to form a low-reflecting colored transparent conductive film.

TABLE 1

| Example | Surface resistance (Ω/□) | $T_{MIN}/T_{MAX}$ | Abrasion resistance | Pencil hardness | Visible light reflectance (%) | Transmittance of film (%) | Chemical resistance Δ (%) |
|---|---|---|---|---|---|---|---|
| 1 | 420 | 0.90 | ○ | 9 H | 0.3 | 55 | 0.1 |
| 2 | 630 | 0.97 | ○ | 9 H | 0.3 | 62 | 0.1 |
| 3 | 1200 | 0.93 | ○ | 9 H | 0.4 | 65 | 0.2 |
| 4 | 1900 | 0.72 | ○ | 9 H | 0.2 | 65 | 0.1 |
| 5 | 2100 | 0.83 | Δ | 7 H | 0.3 | 58 | 0.1 |
| 6 | 3200 | 0.84 | x | 5 H | 0.6 | 56 | 0.1 |

INDUSTRIAL APPLICABILITY

By applying the present coating liquid onto the substrate, the colored transparent conductive film can be formed with the characteristics of the satisfactory electromagnetic wave shielding effect, the excellent transparency, chemical resistance, and abrasion resistance, and the neutral transmitted color tone. Thanks to the use of the ruthenium particles, the present invention realizes production at relatively low cost, is applicable, particularly, to large-area substrates such as panels for cathode ray tubes, and allows easy mass production. Therefore, the present invention has high industrial value.

The entire disclosure of Japanese Patent Application No. 2001-168161 filed on Jun. 4, 2001 including specification, claims, drawings and summary is incorporated herein by reference in its entirety.

What is claimed is:

1. A coating liquid for forming a colored transparent conductive film, which comprises noble metal-supporting ruthenium in a fine particle form wherein a noble metal except for ruthenium is supported in a fine particle form on ruthenium.

2. The coating liquid for formation the colored transparent conductive film according to claim 1, wherein the noble metal is at least one member selected from the group consisting of gold, platinum, palladium, rhodium, and osmium.

3. A method for producing a substrate with a colored transparent conductive film, wherein the coating liquid for forming the colored transparent conductive film as defined in claim 1 is applied onto a substrate, to form a colored transparent conductive film.

4. A substrate with a colored transparent conductive film produced by the method as defined in claim 3.

5. A cathode ray tube wherein the substrate with the colored transparent conductive film as defined in claim 4 is used as a panel, and wherein the colored transparent conductive film is formed on an outside surface of the panel.

6. A method for producing a substrate with a colored transparent conductive film, wherein the coating liquid for forming the colored transparent conductive film as defined in claim 1 is applied onto a substrate, and thereafter a coating liquid containing a silicon alkoxide is applied thereonto, to form a colored transparent conductive film.

7. A substrate with a colored transparent conductive film produced by the method as defined in claim 6.

8. A cathode ray tube wherein the substrate with the colored transparent conductive film as defined in claim 7 is used as a panel, and wherein the colored transparent conductive film is formed on an outside surface of the panel.

9. A substrate with a colored transparent conductive film produced by the method as defined in claim 6, wherein $T_{MIN}/T_{MAX}$, which is a ratio of the minimum value $T_{MIN}$ to the maximum value $T_{MAX}$ of transmittance in a wavelength range of 400–700 nm, is at least 0.85, the substrate having an excellent abrasion resistance.

10. A cathode ray tube wherein the substrate with the colored transparent conductive film as defined in claim 9 is used as a panel, and wherein the colored transparent conductive film is formed on an outside surface of the panel.

11. A method for producing a coating liquid for forming a colored transparent conductive film, wherein a reducing agent is added into a dispersing medium containing ruthenium in a fine particle form, and thereafter a compound of a noble metal except for ruthenium is added thereinto, to form a coating liquid for forming a colored transparent conductive film.

12. The method according to claim 11, wherein said compound of said noble metal is a noble metal salt.

13. A colored transparent conductive film, comprising:
a noble metal, other than ruthenium, in a fine particle form supported on ruthenium in a fine particle form.

14. A substrate, coated with a colored transparent conductive film as defined in claim 13.

15. The substrate according to claim 14, further comprising a layer comprising a silicon alkoxide.

16. The substrate according to claim 15, wherein $T_{MIN}/T_{MAX}$, which is a ratio of the minimum value $T_{MIN}$ to the maximum value $T_{MAX}$ of transmittance in a wavelength range of 400–700 nm, is at least 0.85, and wherein the substrate has an excellent abrasion resistance.

17. A cathode ray tube, comprising:
the substrate according to claim 16.

18. A cathode ray tube, comprising:
the substrate according to claim 15.

19. A cathode ray tube, comprising:
the substrate according to claim 14.

20. The colored transparent conductive film according to claim 13, wherein an equilibrium potential of the noble metal is 0.42 to 2.0 V larger than the equilibrium potential of ruthenium.

21. The colored transparent conductive film according to claim 13, wherein said fine particle has an average particle size of 10–100 nm.

* * * * *